E. SIVITER & W. HOUGHTALING.
Cam-Slides.

No. 157,029. Patented Nov. 17, 1874.

Witnesses.
John Becker
Fred Haynes

Emanuel Siviter
William Houghtaling
by their Attorneys
Brown & Allen

UNITED STATES PATENT OFFICE.

EMANUEL SIVITER, OF WEST STRATFORD, AND WILLIAM HOUGHTALING, OF BRIDGEPORT, CONNECTICUT.

IMPROVEMENT IN CAM-SLIDES.

Specification forming part of Letters Patent No. 157,029, dated November 17, 1874; application filed September 15, 1874.

*To all whom it may concern:*

Be it known that we, EMANUEL SIVITER, of West Stratford, and WILLIAM HOUGHTALING, of Bridgeport, both in the county of Fairfield and State of Connecticut, have jointly invented an Improved Cam-Slide for sewing-machine or other machinery, of which the following is a specification:

Our invention relates to means for communicating motion from a grooved cam for various mechanical purposes or actions. The invention consists in the combination of a spherical stud with a divided slide or block working in a cam-groove, said stud and block being provided with means for expanding them, in order to compensate for wear and friction. The invention consists further in the peculiar construction of the divided or bifurcated slide or block, as hereinafter particularly described.

Figure 1:
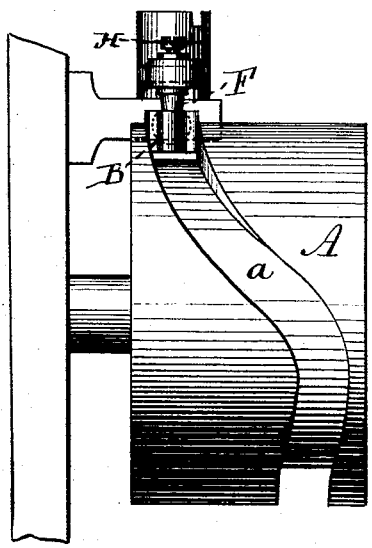
Figure 2:
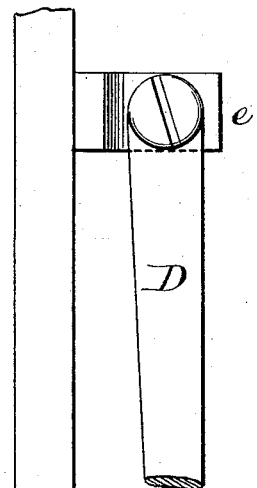
Figure 3:
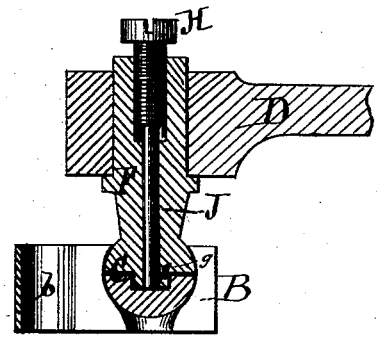
Figure 3:
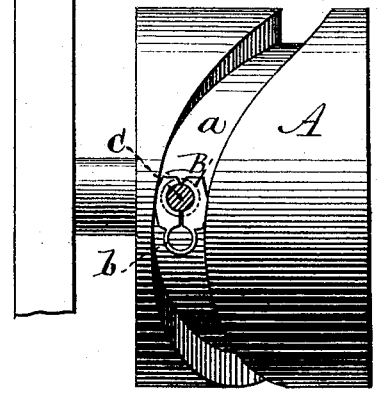

In the accompanying drawing, Figure 1 is a side view of our invention. Fig. 2 is another side view at right angles to Fig. 1. Fig. 3 is a sectional view on an enlarged scale.

A represents a peripherically-grooved cam, the groove $a$ being of any suitable shape and direction. B is a cam-slide, consisting of a bifurcated block working in the groove $a$. The portion $b$ of the block which forms the connection between the branches or bifurcations is thin and elastic, and constitutes a spring, which has a tendency to expand or separate said branches. The inner sides of the block are of concave hemispherical form, and receive a spherical stud, C, on the end of a pivot, F, attached to the lever D, which has its fulcrum at $e$, Fig. 2, and may connect with the needle-bar or feed mechanism of a sewing-machine, or any other suitable piece of machinery. The stud C is composed of two parts, hemispherical in form, the inner half being made in one piece with the pivot F, and the outer half having a cavity in the center of its plane surface fitting a projection, $g$, in the center of the plane surface of the inner half.

Through the center of the projection $g$ and a portion of the pivot F works a pin, J, the outer end of which bears against the center of the plane surface of the outer half of the stud. A set-screw, H, works in the pivot F, in such a manner that its point bears against the inner end of the pin J, so that by tightening the screw the pin is made to bear against the outer half of the stud. The outer surfaces of the slide or block B are curved sufficiently to enable it to travel easily and smoothly in the groove $a$.

When the slide B becomes worn loose from friction it is adjusted to fit the groove by tightening the set-screw H, which has the effect of pressing the pin J against the outer half of the stud C, and causing said outer half to fit closely between the branches and expand the block B, so that it will fit properly in the cam-groove $a$.

The block B and its spring $b$ may be all in one piece, or the branches and spring may be in three separate pieces. We prefer, however, to make all in one piece, as shown.

The stud C is herein spoken of as spherical, but by this term spherical we intend to embrace a spheroidal or approximate and equivalent form.

What we claim as new, and desire to secure by Letters Patent, is—

1. The combination of the set-screw H, pin J, pivot F, adjustable spherical stud C, and divided slide or block, substantially as and for the purpose shown and described.

2. The divided block B of bifurcated construction, having its branches connected by the spring $b$, the whole forming a single piece, substantially as shown and described.

EMANUEL SIVITER.
WILLIAM HOUGHTALING.

Witnesses:
L. S. CATLIN,
JOSEPH H. LUTZ.